(12) United States Patent
Tanner

(10) Patent No.: US 7,516,666 B2
(45) Date of Patent: Apr. 14, 2009

(54) PRESSURE PICKUP WITH EXCHANGEABLE PROCESS CONNECTION

(75) Inventor: Jürgen Tanner, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 11/578,842

(22) PCT Filed: Mar. 23, 2005

(86) PCT No.: PCT/EP2005/051346

§ 371 (c)(1), (2), (4) Date: Jul. 23, 2007

(87) PCT Pub. No.: WO2005/100940

PCT Pub. Date: Oct. 27, 2005

(65) Prior Publication Data

US 2007/0283764 A1    Dec. 13, 2007

(30) Foreign Application Priority Data

Apr. 19, 2004 (DE) .................. 10 2004 019 389

(51) Int. Cl.
*G01L 13/02* (2006.01)
(52) U.S. Cl. .......................... 73/716; 73/706
(58) Field of Classification Search .......... 73/756, 73/700, 706, 716

See application file for complete search history.

(56) References Cited

U.S. PATENT DOCUMENTS

| 4,527,430 | A | 7/1985 | Leathers |
| 5,665,920 | A | 9/1997 | Martin |
| 6,035,722 | A | 3/2000 | Giersch |
| 6,631,644 | B2 * | 10/2003 | Burczyk et al. ............... 73/716 |
| 7,152,477 | B2 * | 12/2006 | Banholzer et al. ............ 73/700 |
| 2005/0056097 | A1 * | 3/2005 | Banholzer et al. ............ 73/700 |
| 2006/0053893 | A1 * | 3/2006 | Banholzer et al. ............ 73/715 |
| 2007/0151352 | A1 * | 7/2007 | Lange ......................... 73/736 |

FOREIGN PATENT DOCUMENTS

DE          42 34 290 C2       4/1994

(Continued)

OTHER PUBLICATIONS

Efector 500, a German publication.

*Primary Examiner*—Andre J Allen
(74) *Attorney, Agent, or Firm*—Bacon & Thomas, PLLC

(57) ABSTRACT

A pressure pickup comprising: A pressure sensor; a pressure pickup housing, which, preferably, defines in its interior a sensor chamber, in which the sensor is arranged The pressure pickup housing further includes a housing end surface having a housing opening, through which the sensor can be exposed to pressure; and a process connection, which has in a process connection face a process connection opening, wherein the process connection is connectable with the pressure pickup housing in such a manner that the process connection opening aligns with the housing opening and such that the process connection face surrounds the housing end surface Between the pressure pickup housing and the process connection, a sealing ring is arranged, which is comprised of an elastomeric material, and which seals a gap between the process connection face and the housing end surface, wherein, preferably, the regions of the process connection face and the housing end surface bordering the gap are coplanar with one another.

16 Claims, 1 Drawing Sheet

FOREIGN PATENT DOCUMENTS

| | | |
|---|---|---|
| DE | 44 07 212 C1 | 8/1995 |
| DE | 196 28 551 A1 | 2/1997 |
| DE | 196 16 658 A1 | 9/1997 |
| DE | 197 24 309 A1 | 12/1998 |
| EP | 0 723 143 B1 | 7/1996 |

* cited by examiner

PRESSURE PICKUP WITH EXCHANGEABLE PROCESS CONNECTION

FIELD OF THE INVENTION

The present invention relates to pressure pickups, especially a pressure pickup with an exchangeable process connection.

BACKGROUND OF THE INVENTION

Pressure pickups are normally connected to a pressurized conduit or a pressurized container by means of a process connection. For minimized logistic expenditure, it is desirable that a precalibrated standard module of pressure pickup can be joined to a variety of process connections, as needed, without there being adverse effects on the calibration due to the joining of the standard module with the process connection. Having said that, hygienic applications require joints free of dead space and gaps, in order to ensure a simple cleaning of the medium-containing containers, or medium-conveying conduits, on which the pressure pickup is mounted. For avoiding gaps, the pressure switch of the Efector 500 family with the designation PI2053 of the firm ifm Electronik employs a metal seal. In this assembly, the absence of effects on the calibration of the pressure pickup seems doubtful based on the required increased compressive force.

SUMMARY OF THE INVENTION

It is thus an object of the invention to provide a pressure pickup with an improved joining with process connections. This object is achieved by the pressure pickup of the invention as defined in the independent claim 1.

A pressure pickup of the invention includes:
a pressure sensor;
a pressure pickup housing, which preferably defines in its interior a sensor chamber in which the sensor is arranged, with the pressure pickup housing additionally having a housing end surface with an opening, through which the sensor can be exposed to pressure; and
a process connection having in a process connection face a process connection opening, wherein the process connection can be joined with the pressure pickup housing such that the process connection opening aligns with the housing opening and the process connection face surrounds the housing end surface, wherein there is arranged between the pressure pickup housing and the process connection a sealing ring, which comprises an elastomeric material, and which seals a gap between the process connection face and the housing end surface, with the regions of the process connection face and housing end surface bordering the gap preferably being coplanar with one another.

In its assembly section adjacent to its end surface, the pressure pickup housing preferably has an essentially axially symmetric, or at least sectionally cylindrically symmetric construction. A first lateral surface section of the assembly section has adjacent to the housing end surface a basin-shaped, first seal seat, which supports the sealing ring axially and radially. The first seal seat can include, for example, a section of a toroidal surface or a ball race.

The first seal seat preferably has a first smooth transition to the end surface of the housing. The first transition can extend, for example, as a bead-like encirclement of the assembly section of the housing. Furthermore, the seal seat has a second transition to a second lateral surface section of the assembly section bordering the side of the seal seat facing away from the housing end surface. The second transition is also preferably smooth. In planes containing the cylindrical axis, the first seal seat is concave, while the first and second transitions are convex. The radii of curvature of the concave area preferably sweep an angular range of at least 135°, more preferredly at least 150°, and especially preferredly at least 180°.

The maximum radius of the second lateral surface section is greater than the maximum radius of the first transition. I.e., the first transition bordering the end surface of the housing is shifted radially inwards relative to the second lateral surface section of the assembly section. In this way, the sealing ring is supported axially and radially by the first seal seat, such that when the assembly section of the pressure pickup housing is inserted into the process connection opening, it can be compressed axially and radially between the first seal seat and the process connection opening.

For this purpose, the process connection opening has a structure complementary to the assembly section of the pressure pickup housing. Thus, the process connection face has, on its interior edge facing the process connection opening, a third smooth, convex transition to a second basin-shaped seal seat, which in turn transitions into the cylindrical interior wall of the process connection opening. The minimum radius of the process connection opening, which extends in the area of the third transition, is less than the maximum radius of the second transition and greater than the maximum radius of the first transition. The difference between the minimum radius of the process connection opening and the maximum radius of the first transition is preferably not more than half the material thickness of the sealing ring, more preferredly not more than a third, and especially preferredly not more than a fourth of the material thickness of the sealing ring. This limitation is advantageous in preventing the sealing ring from protruding too far out of the gap.

Nevertheless, it is advantageous when the difference between the minimum radius of the process connection opening and the maximum radius of the first transition is sufficiently great that the sealing ring is pressed forward in the gap between the housing end surface and the process connection face such that the sealing lines, that is, the contact lines on the media side between, on the one hand, the sealing ring and the pressure pickup housing, and, on the other hand, the sealing ring and the process connection, are shifted into the regions of the first and third convex transitions in such a way that a seal results, which is gap-free and fulfills requirements of hygiene. For this, the difference between the minimum radius of the process connection opening and the maximum radius of the first transition is preferably not less than a sixth of the material thickness of the sealing ring, more preferredly not less than a fifth of the material thickness of the sealing ring.

For a compact sealing geometry, the minimum radius of curvature in the first and third convex transitions is preferably not more than a sixth, and more preferredly not more than an eighth, of the material thickness of the sealing ring. Furthermore, the minimum radius of curvature in the first or third convex transitions is preferably not less than a twelfth, and more preferredly not less than a tenth of the material thickness of the sealing ring.

In a presently preferred embodiment, the process connection and the pressure pickup housing have complementary threaded sections, such that the pressure pickup housing can be screwed into the process connection. For determining an exact axial position of the components to one another, axial stop surfaces are provided, which are formed by radial steps. It has been found that, especially in the case of threaded components, a twist-free processing of the transitions and seal seats can be omitted.

In an embodiment of the pressure pickup of the invention, the housing opening is sealed with a pressure sensitive membrane, or diaphragm, especially a metal membrane, which introduces the pressure acting on it into a hydraulic pressure transfer system, with which the pressure is conveyed to the pressure sensor in the pressure pickup housing.

The pressure pickup housing and the process connection are made, for example, of metallic materials, such as high-grade steel, e.g. a high-grade stainless steel, or aluminum, among others. As the seal material, for example, EPDM is suitable.

BRIEF DESCRIPTION OF THE DRAWINGS

Further details will become apparent from the description of an example of an embodiment illustrated in the drawing, the figures of which show as follows.

DESCRIPTION OF THE PREFERRED EMBODIMENTS

Figure 1:
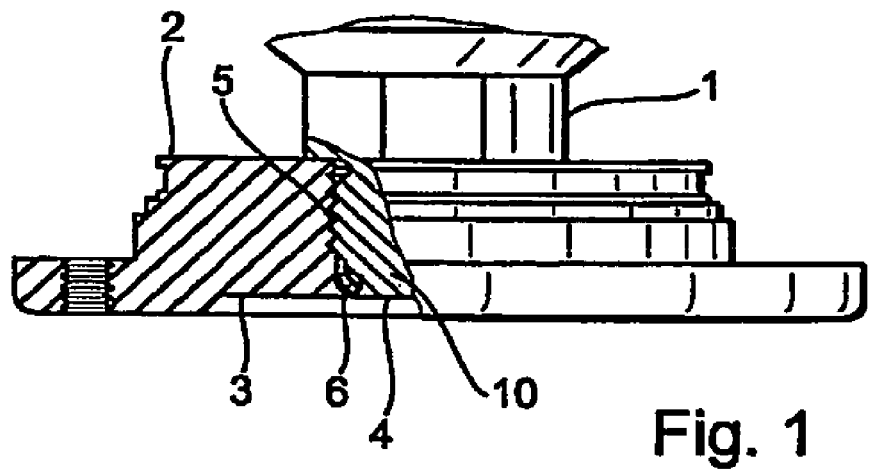
FIG. 1 a partial longitudinal section through a process connection flange, with a screwed-in assembly section of a pressure pickup.
Figure 2:
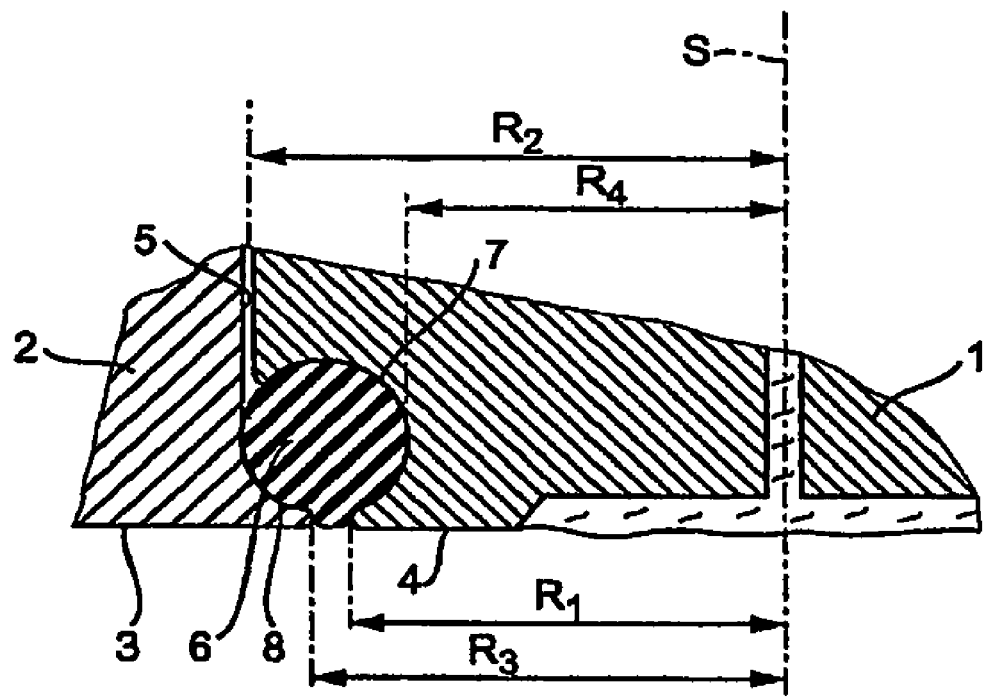
FIG. 2 a detail view of FIG. 1.

The example of an embodiment illustrated in FIGS. 1 and 2 includes a pressure pickup having a pressure pickup housing 1, which includes an assembly section 10 screwed flushly into a process connection opening 5 of a process connection 2. The pressure pickup housing 1 has an end surface 4, which is surrounded by an essentially coplanar, process connection face 3 of the process connection 2. The housing and the process connection are made of high-grade steel, e.g. a high-grade stainless steel.

A gap existing between face 3 and end surface 4 is sealed by a sealing ring 6, such that there is, in effect, a gap-free joint between the process connection 2 and the pressure pickup housing 1. The sealing ring is made of an elastomeric material, for example EPDM. The sealing ring has an inner diameter of 15.54 mm and a material thickness of 2.62 mm. The inner diameter corresponds to twice the value of the minimum radius $R_4$ of a first, basin-shaped, seal seat 7 formed in the lateral surface of the assembly section 10. The first seal seat 7 is toroidally basin-shaped, and its radius of curvature in sectional cutting planes containing the axis of symmetry S is approximately equal to half the material thickness of the sealing ring 6. The concave part of the first seal seat 7 is limited from the end surface 4 of the housing by a first convex, smooth, e.g. burr-free, transition, whose minimum radius of curvature in the previously-defined, axis-containing, sectional cutting planes is approximately 0.3 mm. The maximum radius $R_1$ of the first transition is approximately 8.75 mm.

On the lateral surface of the transmitter housing, a second convex transition is provided, again having a minimum radius of curvature of 0.3 mm in the axis-containing, sectional cutting planes. The radius $R_2$ of the adjacent lateral surface is sufficiently large that the radial step between $R_4$ and the second transition can serve as an axial support of the sealing ring 6 for the axial compression thereof. The face 3 of the process connection is limited in the direction of the opening by a third convex transition, which again has a minimum radius of curvature of approximately 0.3 mm in the axis-containing, sectional cutting planes, and on which follows a second, basin-shaped, seal seat 8, which eventually transitions into a cylindrical wall section of the process connection opening 5. In a convex section, the second basin-shaped sealing seat has the approximately the same radius of curvature as the convex section of the basin-shaped seal seat 7. The minimum radius $R_3$ of the third transition is smaller than the radius $R_2$ of the second transition and 0.55 mm larger than the maximum radius $R_1$ of the first transition. The gap between the face of the process connection 2 and the end surface of the pressure pickup housing 1 is sealed by means of the sealing ring 6. As a result of the axial compression caused by screwing the pressure pickup housing into the process connection opening, the sealing ring 6 is pressed so far into the gap that the contact lines between the sealing ring 6 and the first and third transitions are shifted toward face 3 and end surface 4 at least to the axial plane of the maximum radius $R_1$, or the axial plane of the minimum radius $R_3$, as the case may be. Preferably, the contact lines run in the axial region between the plane of face 3 and end surface 4 and the axial plane of the maximum radius $R_1$, or the minimum radius $R_3$, as the case may be.

The invention claimed is:

1. A pressure pickup, comprising:
   a pressure sensor;
   a pressure pickup housing, wherein said pressure pickup housing has a housing end surface containing a housing opening, through which a pressure sensor can be exposed to a pressure; and
   a process connection, which has a process connection opening in a process connection face, wherein:
   said process connection is connectable with said pressure pickup housing in a manner such that said process connection opening aligns with said housing opening and such that a process connection face surrounds said housing end surface; and
   between said pressure pickup housing and said process connection, a sealing ring is arranged, which is comprised of an elastomeric material and which seals a gap between said process connection face and said housing end surface.

2. The pressure pickup as claimed in claim 1, wherein:
   the regions of said process connection face and said housing end surface bordering on said gap are coplanar with one another.

3. The pressure pickup as claimed in claim 1, wherein:
   said pressure pickup housing defines in its interior a sensor chamber, in which said pressure sensor is arranged.

4. The pressure pickup as claimed in claim 1, wherein:
   said pressure pickup housing has, in an assembly section bordering said housing end surface, an essentially axially symmetric, or at least sectionally cylindrically symmetric construction.

5. The pressure pickup as claimed in claim 4, wherein:
   a first lateral surface section of said assembly section of said pressure pickup housing has, bordering on said housing end surface, a basin-shaped, first seal seat, which supports said sealing ring axially and radially.

6. The pressure pickup as claimed in claim 5, wherein:
   said first seal seat preferably has a first, smooth transition to said housing end surface.

7. The pressure pickup as claimed in claim 6, wherein:
   said first seal seat has a second transition to a second lateral surface section of the assembly section, which second lateral surface section borders on a side of said seal seat facing away from said housing end surface.

8. The pressure pickup as claimed in claim 7, wherein:
   in planes containing a cylindrical axis, said first seal seat is concave and said first and second transitions are convex.

9. The pressure pickup as claimed in claim 7, wherein:
the maximum radius of said second lateral surface section is greater than the maximum radius of said first transition.

10. The pressure pickup as claimed in claim 1, wherein:
said process connection face has on its inner edge facing said process connection opening a third, convex transition to a second, basin-shaped seal seat, which transitions into a cylindrical inner wall of said process connection opening.

11. The pressure pickup as claimed in claim 10, wherein:
a minimum radius of said process connection opening in the region of said third transition is smaller than the maximum radius of said second transition and greater than the maximum radius of said first transition.

12. The pressure pickup as claimed in claim 11, wherein:
a difference between the minimum radius of said process connection opening and the maximum radius of said first transition is not more than half of the material thickness of said sealing ring, further preferably not more than a third and especially preferably not more than a fourth of the material thickness of said sealing ring.

13. The pressure pickup as claimed in claim 11, wherein:
the difference between said minimum radius of said process connection opening and said maximum radius of said first transition is not less than one-sixth of the material thickness of said sealing ring, further preferably not less than one-fifth of the material thickness of said sealing ring.

14. The pressure pickup as claimed in claim 11, wherein:
a minimum radius of curvature in said first, or third, convex transition, as the case may be, is not more than one-sixth, and further preferably not more than one-eighth, of the material thickness of said sealing ring.

15. The pressure pickup as claimed in claim 11, wherein:
said minimum radius of curvature in said first, or third, convex transition, as the case may be, is not less than one-twelfth, and further preferably not less than one-tenth, of the material thickness of said sealing ring.

16. The pressure pickup as claimed in claim 1, wherein:
said process connection and said pressure pickup housing have threaded sections fitting one another, so that said pressure pickup housing can be screwed into said process connection.

* * * * *